United States Patent
Morikami et al.

(10) Patent No.: US 9,511,839 B2
(45) Date of Patent: Dec. 6, 2016

(54) CONTROL DEVICE FOR OUTBOARD MOTORS, CONTROL METHOD FOR OUTBOARD MOTORS, AND PROGRAM

(71) Applicant: SUZUKI MOTOR CORPORATION, Hamamatsu-shi, Shizuoka (JP)

(72) Inventors: Tadaaki Morikami, Hamamatsu (JP); Masaya Nishio, Hamamatsu (JP); Takanori Miyoshi, Toyohashi (JP); Toyohiro Yumiba, Toyohashi (JP)

(73) Assignee: SUZUKI MOTOR CORPORATION, Hamamatsu-Shi, Shizuoka (JP)

( * ) Notice: Subject to any disclaimer, the term of this patent is extended or adjusted under 35 U.S.C. 154(b) by 0 days.

(21) Appl. No.: 14/433,729

(22) PCT Filed: Jul. 25, 2013

(86) PCT No.: PCT/JP2013/070189
§ 371 (c)(1),
(2) Date: Apr. 6, 2015

(87) PCT Pub. No.: WO2014/057725
PCT Pub. Date: Apr. 17, 2014

(65) Prior Publication Data
US 2015/0246714 A1  Sep. 3, 2015

(30) Foreign Application Priority Data
Oct. 11, 2012  (JP) .................................. 2012-226298

(51) Int. Cl.
*B63H 20/12* (2006.01)
*B63H 25/42* (2006.01)
(Continued)

(52) U.S. Cl.
CPC .............. *B63H 20/12* (2013.01); *B63H 21/22* (2013.01); *B63H 21/265* (2013.01); *B63H 25/42* (2013.01);
(Continued)

(58) Field of Classification Search
CPC ....... B63H 20/12; B63H 25/42; B63H 21/213; B63H 21/22; B63H 21/265; G05D 1/0206
See application file for complete search history.

(56) References Cited

U.S. PATENT DOCUMENTS 7,467,595 B1  12/2008  Lanyi et al.
8,170,734 B2  5/2012  Kaji
(Continued)

FOREIGN PATENT DOCUMENTS

| JP | H01-285486 | 11/1989 |
| JP | 2010-126085 | 6/2010 |
| JP | 2011-140272 | 7/2011 |

OTHER PUBLICATIONS

International Preliminary Report on Patentability issued in corresponding PCT Application No. PCT/JP2013/070189.
(Continued)

*Primary Examiner* — Michael D Lang
(74) *Attorney, Agent, or Firm* — Troutman Sanders LLP

(57) ABSTRACT

In a control device for outboard motors that controls two outboard motors attached to a boat, according to an operation by an operating lever that is tiltable in all directions from a neutral state, when the operating lever is moved to a different zone, a steering control unit controls shift positions of the two outboard motors and a steering specification according to a zone to which the operating lever is moved first, until a determination unit determines that the operating lever is in the neutral state, thereby enabling steering easily reflecting the intention of a boat operator and improving a (Continued)

steering efficiency even when an operation of moving from zone to zone is performed.

6 Claims, 9 Drawing Sheets

(51) Int. Cl.
    *B63H 21/22*     (2006.01)
    *G05D 1/02*     (2006.01)
    *B63H 25/24*     (2006.01)
    *B63H 20/00*     (2006.01)
    *B63H 21/21*     (2006.01)

(52) U.S. Cl.
    CPC ............. *G05D 1/0206* (2013.01); *B63H 25/24* (2013.01); *B63H 2020/003* (2013.01); *B63H 2021/216* (2013.01)

(56) References Cited

U.S. PATENT DOCUMENTS

| | | |
|---|---|---|
| 8,700,238 B2 | 4/2014 | Hiramatsu |
| 2010/0138083 A1 | 6/2010 | Kaji |
| 2011/0166724 A1 | 7/2011 | Hiramatsu |
| 2012/0135649 A1 | 5/2012 | Morvillo |

OTHER PUBLICATIONS

International Search Report dated Oct. 29, 2013, which issued during prosecution of International Application No. PCT/JP2013/070189, which corresponds to the present application.

Extended European Search Report dated Jul. 1, 2016 of the corresponding European patent application No. 13845936.7.

F I G. 1
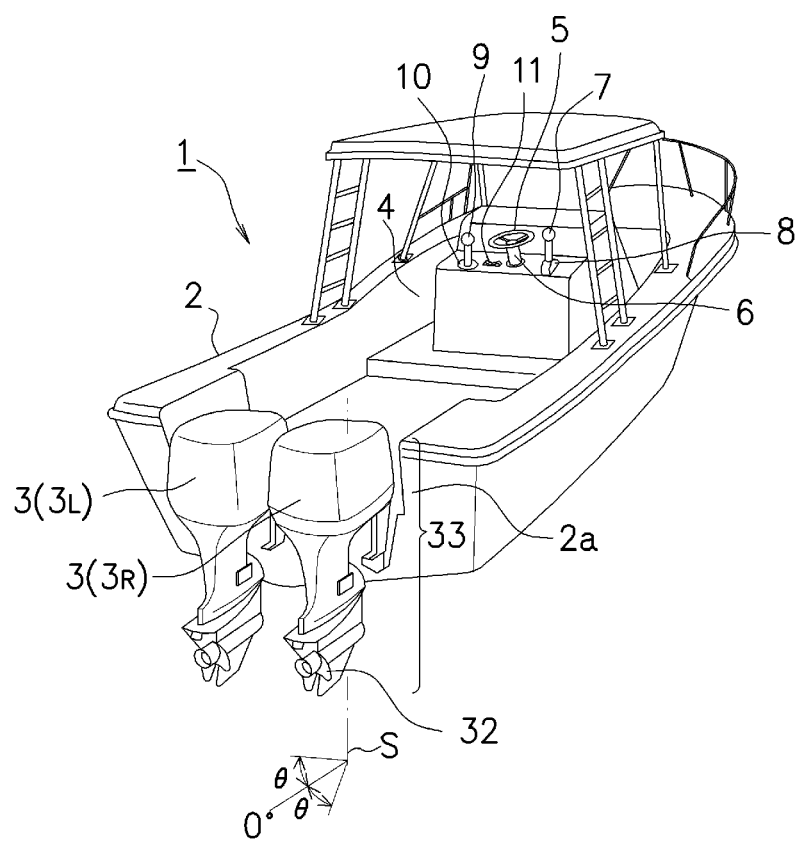

F I G. 2
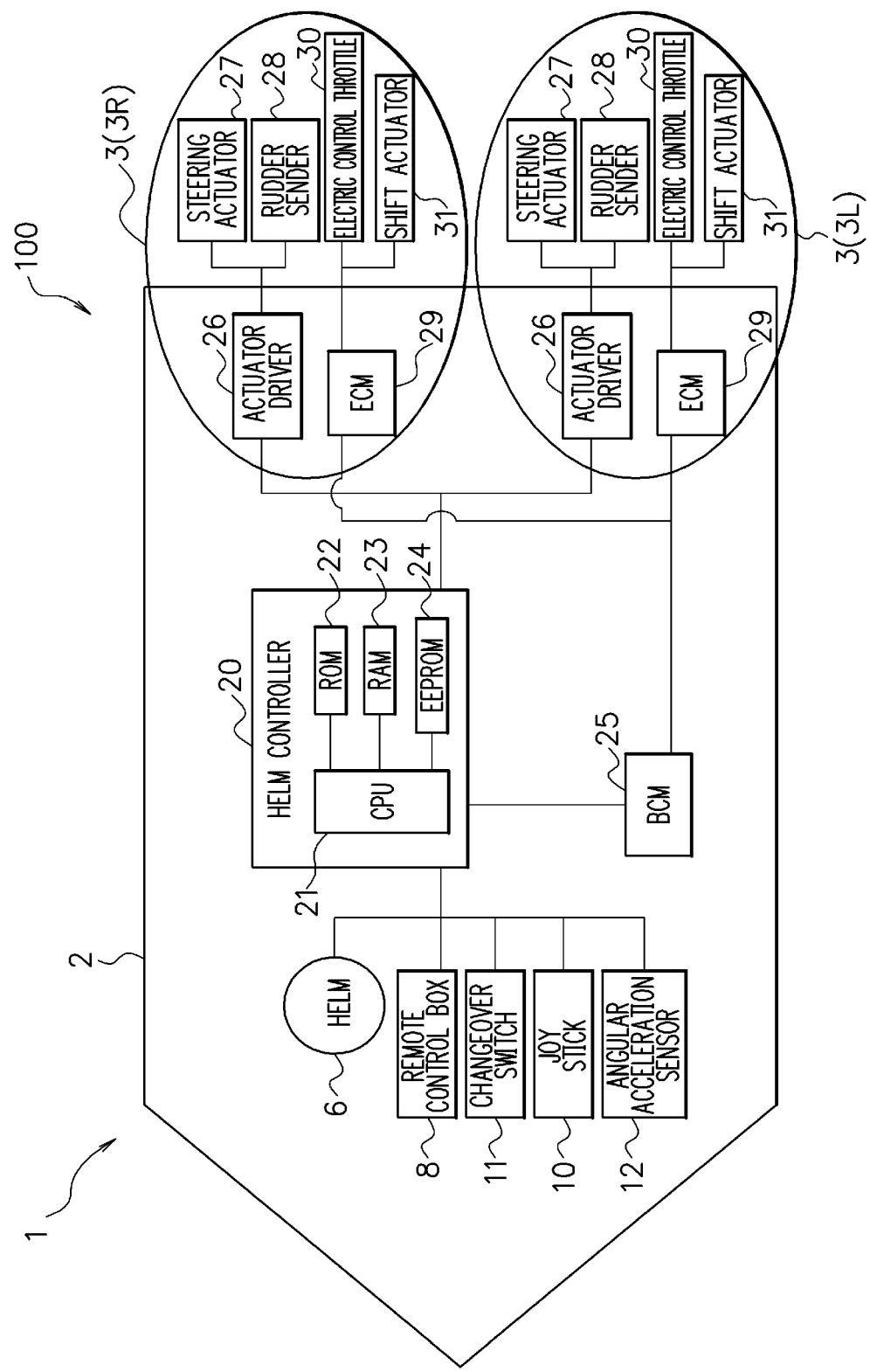

FIG. 6

| OPERATION | | FRONT TILT | RIGHT TILT | REAR TILT | LEFT TILT | RIGHT TURN AT FIXED POINT | LEFT TURN AT FIXED POINT |
|---|---|---|---|---|---|---|---|
| OPERATION REGION | | ZONE 1 | ZONE 2 | ZONE 3 | ZONE 4 | ZONE 5 | ZONE 6 |
| BOAT BEHAVIOR | | FORWARD MOVEMENT | RIGHT PARALLEL MOVEMENT | REARWARD MOVEMENT | LEFT PARALLEL MOVEMENT | RIGHT TURN AT FIXED POINT | LEFT TURN AT FIXED POINT |
| SHIFT POSITION | LEFT OUTBOARD MOTOR | F | F | R | R | F | R |
| | RIGHT OUTBOARD MOTOR | F | R | R | F | R | F |
| STEERING SPECIFICATION | | ALMOST PARALLEL | LETTER OF "V" | ALMOST PARALLEL | LETTER OF "V" | PARALLEL | PARALLEL |

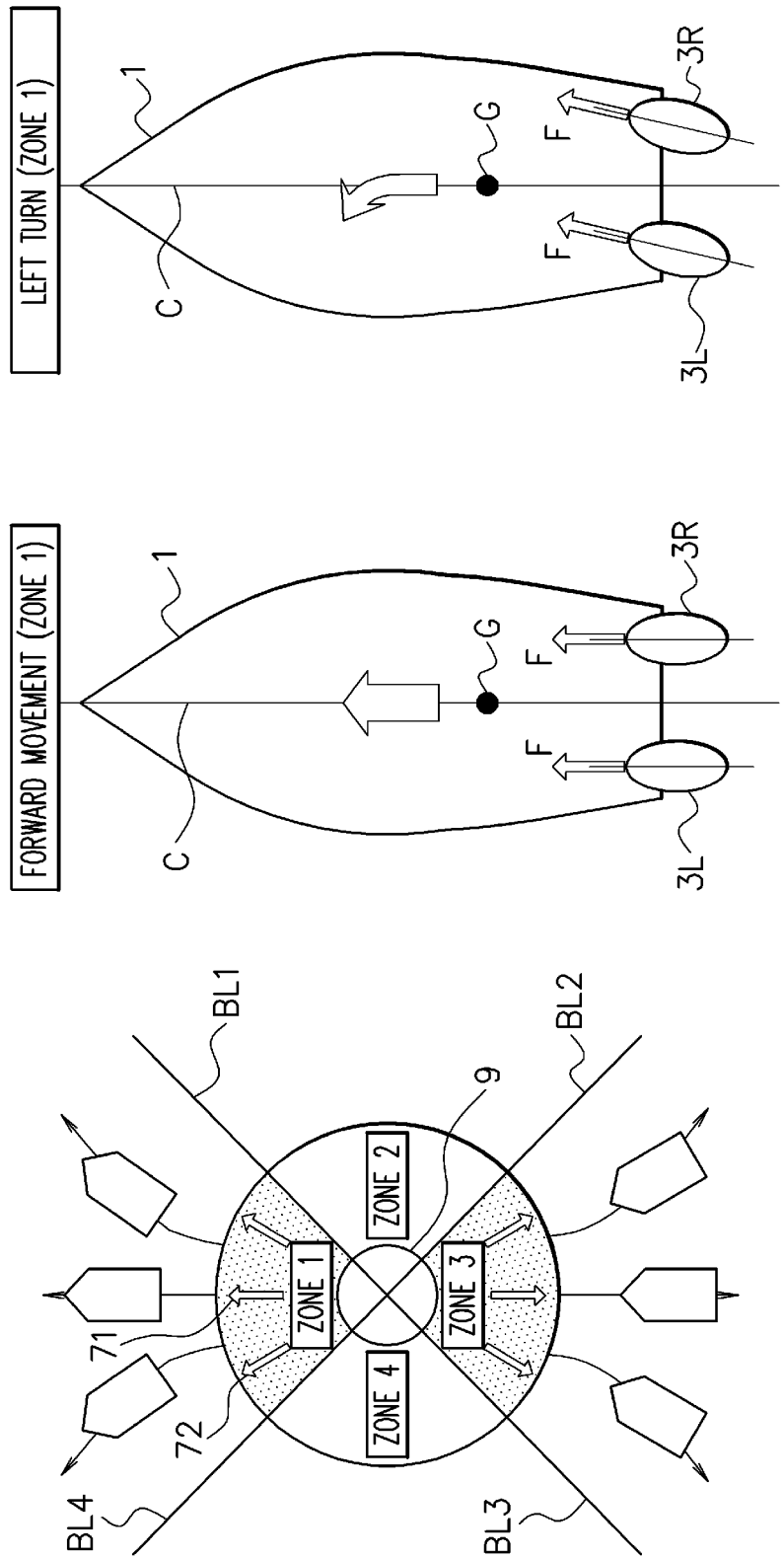

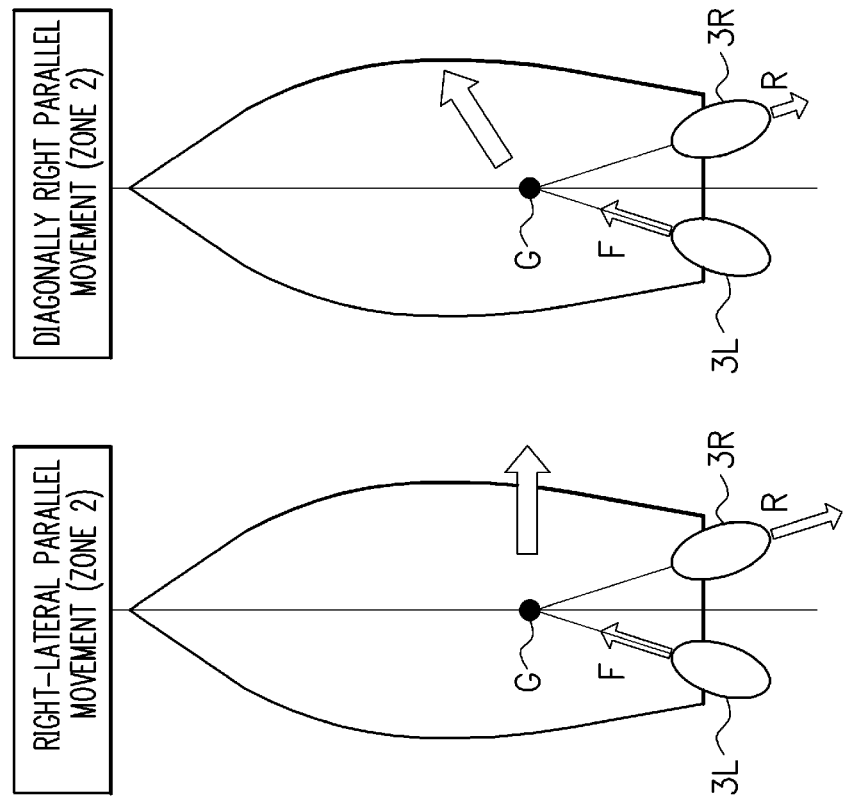
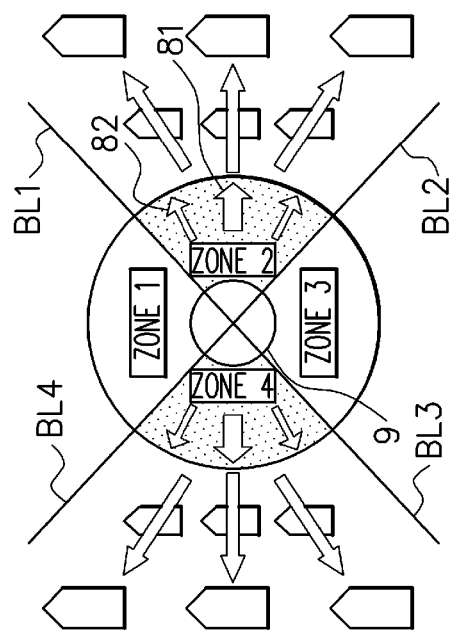

F I G. 9A
F I G. 9B
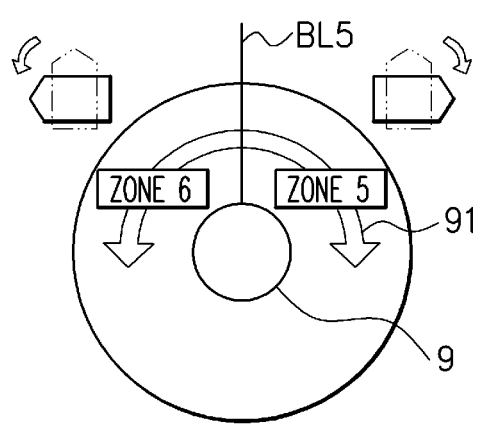
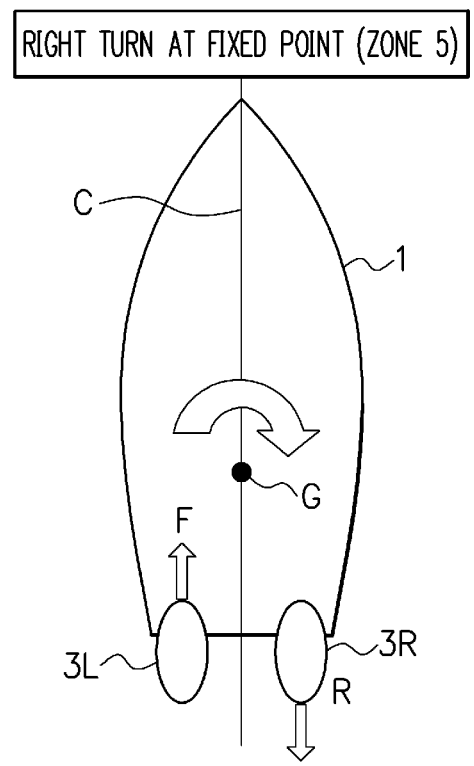

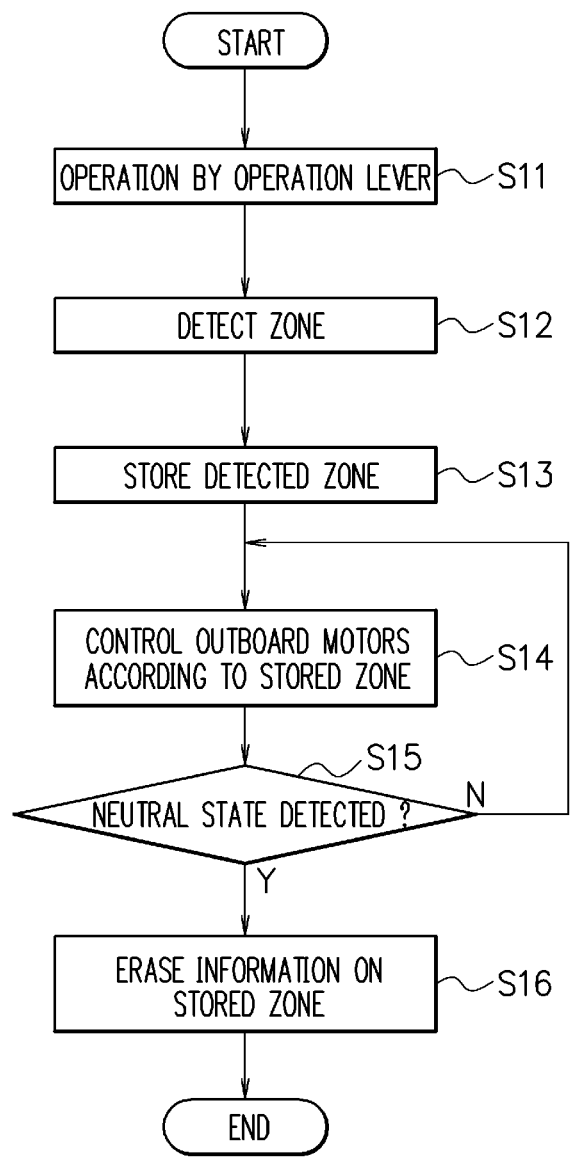

CONTROL DEVICE FOR OUTBOARD MOTORS, CONTROL METHOD FOR OUTBOARD MOTORS, AND PROGRAM

CROSS REFERENCE TO RELATED APPLICATIONS

This application is a U.S. National Phase Application under 35 U.S.C. §371 of International Patent Application PCT/JP2013/070189 filed Jul. 25, 2013 which claims priority to Japanese Patent Application 2012-226298 filed Oct. 11, 2012. The International Application was published on Apr. 17, 2014, as International Publication No. WO 2014/057725 under PCT Article 21(2). The entire contents of these applications are hereby incorporated by reference.

TECHNICAL FIELD

The present invention relates to a control device for outboard motors, a control method for outboard motors, and a computer readable non-transitory recording medium. In particular, the present invention is preferably used in the case of steering a boat using an operating lever that is tiltable in all directions from a neutral state.

BACKGROUND ART

A large-scale boat or the like has two outboard motors equipped on the right and left of a transom board of a hull in some cases in order to obtain a large thrust. In the boat equipped with the two outboard motors, controlling steering angles of the outboard motors to different directions or controlling shift positions of the outboard motors to different shift positions enables not only normal turns to the right and left directions but also parallel movements in the right and left directions and turns at a fixed point to the right and left.

There is a known boat equipped with a joystick in addition to a steering wheel to allow a boat operator to easily perform steering such normal turns, parallel movements, and turns at a fixed point. For example, a maneuvering device for ship capable of freely perform the parallel movements and the turns at a fixed point by the operation of one operating unit through use of a joystick is disclosed in Patent Literature 1.

In the maneuvering device for ship disclosed in Patent Literature 1, an operation region of an operating lever of the joystick is divided into a first zone, a second zone, and a third zone, and steering angles and engine speeds of propellers according to the position and the quantity of turn of the operating lever are stored on a map for each divided zone. A maneuvering device for outboard motors can easily steer the ship by controlling the propellers to the steering angles and the engine speeds based on the map according to the position and the quantity of turn of the operating lever.

CITATION LIST

Patent Literature

Patent Literature 1: Japanese Laid-open Patent Publication No. 1-285486

SUMMARY OF INVENTION

Technical Problem

However, the case of performing the steering by using the joystick being an omnidirectional operating unit has a problem that it is difficult to coincide the steering of the boat when the operating lever is moved to a different zone from a zone to which the operating lever is moved first, with the steering intended by each boat operator.

It is assumed, for example, that a boat moves forward when the operating lever is tilted from a neutral state in which the operating lever vertically stands up to a zone that is set on the front side and moves rearward when the operating lever is tilted to a zone that is set on the rear side, and moves parallel rightward when the operating lever is tilted from the neutral state to a zone that is set on the right side and moves parallel leftward when the operating lever is tilted to a zone that is set on the left side. Here, it is assumed that the boat operator moves the operating lever to the right zone while keeping it in the tilted state without returning it from the state of tilting to the front zone to the neutral state. In this case, there are conceivable steering methods, such as a steering method of turning the boat to the right from the forward movement and a steering method of moving the boat parallel rightward from the forward movement. Therefore, when an operation of moving the operating lever from zone to zone is performed, a steering method reflecting more the intention of the boat operator is more preferable.

Besides, only the steering angle of the outboard motor is changed when the boat is turned to the right from the forward movement, whereas the shift position of the outboard motor also needs to be changed when the boat is moved parallel rightward from the forward movement. Accordingly, a problem when an operation of moving the operating lever from zone to zone is performed is that the shift position is unintentionally changed depending on the steering method to be employed, resulting in decreased steering efficiency.

The present invention has been made in consideration of the above problems and its object is to enable steering easily reflecting the intention of a boat operator and improve a steering efficiency even when an operation of moving from zone to zone is performed when a boat is steered using an omnidirectional operating unit.

Solution to Problem

A control device for outboard motors according to the present invention is a control device for outboard motors that controls two outboard motors attached to a boat, according to an operation by an operating lever that is tiltable in all directions from a neutral state, the control device for outboard motors including: a zone acquisition unit that acquires a zone where the operating lever is located by an operation from a neutral state, among a plurality of zones made by dividing an operation region of the operating lever; a steering control unit that controls shift positions of the two outboard motors and a steering specification according to the zone acquired by the zone acquisition unit; and a determination unit that determines whether the operating lever is in the neutral state, wherein when the operating lever is moved to a different zone, the steering control unit controls the shift positions of the two outboard motors and the steering specification according to the zone acquired by the zone acquisition unit until the determination unit determines that the operating lever is in the neutral state.

A control method for outboard motors according to the present invention is a control method for outboard motors that controls two outboard motors attached to a boat, according to an operation by an operating lever that is tiltable in all directions from a neutral state, the control method for outboard motors including: a zone acquisition step of acquiring a zone where the operating lever is located by an operation from a neutral state, among a plurality of zones made by dividing an operation region of the operating lever; a steering control step of controlling shift positions of the two outboard motors and a steering specification according to the zone acquired by the zone acquisition step; and a determination step of determining whether the operating lever is in the neutral state, wherein when the operating lever is moved to a different zone, the steering control step controls the shift positions of the two outboard motors and the steering specification according to the zone acquired by the zone acquisition step until the determination step determines that the operating lever is in the neutral state.

A computer readable non-transitory recording medium according to the present invention is a computer readable non-transitory recording medium with a program for controlling two outboard motors attached to a boat, according to an operation by an operating lever that is tiltable in all directions from a neutral state, the program causing a computer to execute: a zone acquisition step of acquiring a zone where the operating lever is located by an operation from a neutral state, among a plurality of zones made by dividing an operation region of the operating lever; a steering control step of controlling shift positions of the two outboard motors and a steering specification according to the zone acquired by the zone acquisition step; and a determination step of determining whether the operating lever is in the neutral state, wherein when the operating lever is moved to a different zone, the steering control step controls the shift positions of the two outboard motors and the steering specification according to the zone acquired by the zone acquisition step until the determination step determines that the operating lever is in the neutral state.

Advantageous Effects of Invention

According to the present invention, it is possible to enable steering easily reflecting the intention of a boat operator and improve a steering efficiency even when an operation of moving from zone to zone is performed when a boat is steered using an omnidirectional operating unit.

BRIEF DESCRIPTION OF DRAWINGS

FIG. 1 is a perspective view of a boat viewed from a diagonally rear direction;

FIG. 2 is a block diagram illustrating a configuration of a steering system of the boat;

FIG. 6 is a chart illustrating a table in which the zone and the behavior of the boat are associated with each other;

FIG. 7A is a schematic view illustrating the behavior of the boat when the operating lever is located in the zone 1 or the zone 3;

FIG. 7B is a schematic view illustrating the behavior of the boat when the operating lever is located in the zone 1;

FIG. 7C is a schematic view illustrating the behavior of the boat when the operating lever is located in the zone 1;

FIG. 8A is a schematic view illustrating the behavior of the boat when the operating lever is located in the zone 2 or the zone 4;

FIG. 8B is a schematic view illustrating the behavior of the boat when the operating lever is located in the zone 2;

FIG. 8C is a schematic view illustrating the behavior of the boat when the operating lever is located in the zone 2;

FIG. 9A is a schematic view illustrating the behavior of the boat when the operating lever is located in the zone 5 or the zone 6;

FIG. 9B is a schematic view illustrating the behavior of the boat when the operating lever is located in the zone 5; and FIG. 10 is a flowchart illustrating processing of controlling the behavior of the boat.

DESCRIPTION OF EMBODIMENTS

Figure 3:
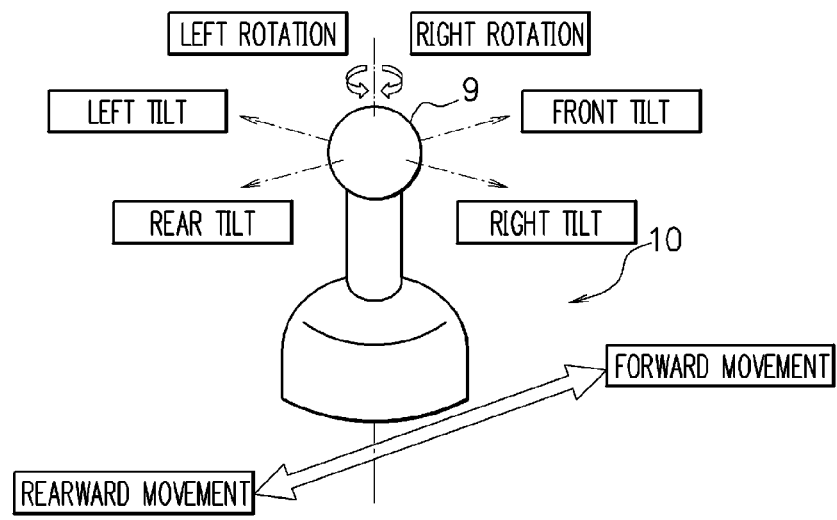
FIG. 3 is a view illustrating an example of an operation using an operating lever of a joystick.

Hereinafter, a preferred embodiment of the present invention will be described with reference to the attached drawings.

FIG. 1 is a perspective view of a boat viewed from a diagonally rear direction. As illustrated in FIG. 1, to a transom 2a located on a rear part of a hull 2 of a boat 1, a plurality of outboard motors 3 each equipped with an engine are attached via bracket devices. In this embodiment, a configuration in which two outboard motors 3L, 3R are attached is illustrated. The two outboard motors 3L, 3R are attached at bilaterally symmetric positions across a center line C (see later-explained FIG. 7B and the like) of the boat 1. The center line C of the boat 1 is a straight line extending in a front-rear direction and passing through a moving center G of the boat 1.

An operation cabin 4 is provided in an almost middle part of the hull 2. In the operation cabin 4, a helm 6 equipped with a steering wheel 5, a remote control box 8 equipped with a remote control lever 7, a joystick 10 equipped with an operating lever 9, and a changeover switch 11 are disposed as operating devices for operating the boat 1. In addition, a display device that displays information about the boat 1 and so on is disposed in the operation cabin 4.

A boat operator operates the steering wheel 5 and the remote control lever 7 to steer the boat 1 at normal time, and operates the operating lever 9 of the joystick 10 to steer the boat 1 when desiring to cause precise behavior of the boat 1 in docking or the like. The boat operator performs selection via the changeover switch 11 to be able to change over between the operation using the steering wheel 5 and the remote control lever 7 and the operation using the operating lever 9 of the joystick 10. Note that the engines of the outboard motors 3L, 3R are controlled not to reach predetermined outputs or more when the operation is changed over to the operation by the joystick 10.

FIG. 2 is a block diagram illustrating a configuration of a steering system of the boat. In FIG. 2, the same components as those in FIG. 1 are given the same numerals. As a steering system 100 in this embodiment, systems of shift-by-wire method, throttle-by-wire method, and steer-by-wire method are used. More specifically, information from the helm 6, the remote control box 8, and the joystick 10 is outputted as electric signals to a later-described helm controller 20, and the helm controller 20 controls shift positions, throttle opening degrees, steering angles of the two outboard motors 3L, 3R using the electric signals to thereby steer the boat 1.

Hereinafter, a concrete configuration of the steering system 100 will be described.

The steering system 100 has an angular acceleration sensor 12, the helm controller 20, a BCM 25 and the outboard motors 3L, 3R in addition to the above-described helm 6, remote control box 8, joystick 10, and changeover switch 11.

The helm 6 has a built-in steering sensor that detects a steering operation angle of the steering wheel 5. The helm 6 outputs information on the detected steering operation angle to the helm controller 20.

The remote control box 8 detects a shift operation position and an operation amount when the remote control lever 7 is operated from a neutral position to a front side or a rear side. The remote control box 8 outputs information on the detected shift operation position and operation amount to the helm controller 20.

The joystick 10 is an omnidirectional operating unit. The joystick 10 has a built-in lever sensor that detects the operation by the operating lever 9. The joystick 10 allows an operation of tilting the operating lever 9 in all directions from a neutral state and an operation of rotating the lever 9 in a left-right direction around its axis. The joystick 10 outputs information on the detected operation by the operating lever 9 to the helm controller 20. Details of the joystick 10 will be described later referring to FIG. 3.

The changeover switch 11 detects a selected position selected by the boat operator and outputs information on the detected selected position to the helm controller 20. The helm controller 20 enables only either the operation by the steering wheel 5 and the remote control lever 7 or the operation by the operating lever 9 and disables the other operation according to the selected position detected by the changeover switch 11.

The angular acceleration sensor 12 is attached to the hull 2, and detects the angular acceleration when the hull 2 turns in a horizontal direction. The angular acceleration sensor 12 outputs information on the detected angular acceleration to the helm controller 20.

The helm controller 20 functions as a control device that controls the outboard motors 3L, 3R. More specifically, the helm controller 20 is electrically connected to the above-described helm 6, remote control box 8, joystick 10, changeover switch 11, and angular acceleration sensor 12, and electrically connected to the BCM 25, and actuator drivers 26 and ECMs 29 of the respective outboard motors 3L, 3R. The helm controller 20 constitutes a so-called computer including a CPU 21, a ROM 22, a RAM 23, an EEPROM 24 and so on.

The CPU 21 realizes processing in a later-described flowchart by executing a program stored in the ROM 22. The ROM 22 is a non-volatile memory and stores a program executed by the CPU 21, setting values for controlling the outboard motors 3L, 3R and so on. The RAM 23 is a volatile memory and temporarily stores information and so on calculated when the CPU 21 controls the outboard motors 3L, 3R. The EEPROM 24 is a rewritable non-volatile memory and stores information and so on when the CPU 21 controls the outboard motors 3L, 3R.

The BCM (boat control module) 25 is electrically connected to the helm controller 20 and the ECMs 29 of the outboard motors 3L, 3R. The BCM 25 transmits instructions from the helm controller 20 to the ECMs 29. The BCM 25 constitutes, similarly to the helm controller 20, a computer including a CPU, a ROM, an EEPROM and so on. Note that the steering system 100 can be constituted with the BCM 25 omitted. In this case, the helm controller 20 can be directly electrically connected to the ECMs 29 of the outboard motors 3L, 3R.

Next, the configurations of the outboard motors 3L, 3R will be described. The outboard motors 3L, 3R have almost the same configuration, and the outboard motor 3R will be taken up for explanation here.

The outboard motor 3R has the actuator driver 26, a steering actuator 27, a RUDDER SENDER 28, the ECM 29, an electric control type throttle 30, and a shift actuator 31.

The actuator driver 26 is electrically connected to the steering actuator 27 and the RUDDER SENDER 28 and controls the steering actuator 27 and the RUDDER SENDER 28.

The steering actuator 27 changes the steering angle of the outboard motor 3R in response to the instruction from the helm controller 20 via the actuator driver 26. More specifically, as illustrated in FIG. 1, the steering actuator 27 rotates a propulsion unit 33 including a propeller 32 to the left and right up to predetermined angles θ respectively around a steering axis (one-dotted chain line S).

The RUDDER SENDER 28 detects an actual steering angle of the outboard motor 3R and outputs it to the actuator driver 26.

Therefore, the actuator driver 26 acquires information on the actual steering angle detected by the RUDDER SENDER 28 to drive the steering actuator 27 so as to form the steering angle instructed from the helm controller 20. Further, the actuator driver 26 outputs the actual steering angle acquired from the RUDDER SENDER 28 to the helm controller 20.

The ECM 29 (engine control module) is electrically connected to the electric control type throttle 30 and the shift actuator 31 and controls the electric control type throttle 30 and the shift actuator 31.

The electric control type throttle 30 changes a throttle angle of a throttle valve of the outboard motor 3R in response to the instruction from the helm controller 20 via the BCM 25 and the ECM 29. Opening the throttle valve increases the output of the engine of the outboard motor 3R to increase the rotation speed of the propeller 32, resulting in increase in thrust of the outboard motor 3R. On the other hand, closing the throttle valve decreases the output of the engine of the outboard motor 3R to decrease the rotation speed of the propeller 32, resulting in decrease in thrust of the outboard motor 3R.

The shift actuator 31 changes the shift position of the outboard motor 3R in response to the instruction from the helm controller 20 via the BCM 25 and the ECM 29. For example, when an instruction of changing the shift position to a rearward direction is given from the helm controller 20, the shift actuator 31 changes the shift position by changing the mesh of gears in the propulsion unit 33. Changing the shift position, the rotation direction of the propeller 32 is changed over from the rotation direction in the forward direction to a reverse direction.

Next, the operation using the operating lever of the joystick in this embodiment will be described referring to FIG. 3. FIG. 3 is a view illustrating an example of the operation using the operating lever of the joystick.

The operating lever 9 of the joystick 10 in this embodiment is tiltable in all directions of 360 degrees from the neutral state of vertically standing upward. Further, the operating lever 9 can be rotated in the left-right direction around the axis of the operating lever 9 from the neural state.

Further, the operating lever 9 is urged by an urging member at all times to return to the neutral state. Accordingly, by releasing a hand or lessening a force from the state where the operating lever 9 is tilted from the neutral state, the boat operator can return the operating lever 9 to the neutral state. Further, similarly by releasing a hand or lessening a force from the state where the operating lever 9 is rotated around its axis, the boat operator can return the operating lever 9 to the neutral state before the operating lever 9 is rotated.

Note that the helm controller 20 brings the outboard motors 3L, 3R into the initial states when the operating lever 9 is in the neutral state. The initial state is a state that the shift positions of the outboard motors 3L, 3R are in the forward direction, the steering angles are 0 degree, and the engines are in an idling state.

The operation of the operating lever 9 in this embodiment can be broadly classified into six operations such as a front tilt operation, a rear tilt operation, a right tilt operation, a left tilt operation, a right rotation operation, and a left rotation operation.

The front tilt operation is an operation of tilting the operating lever 9 in the neutral state to the front side. The rear tilt operation is an operation of tilting the operating lever 9 in the neutral state to the rear side.

The right tilt operation is an operation of tilting the operating lever 9 in the neutral state to the right side. The left tilt operation is an operation of tilting the operating lever 9 in the neutral state to the left side.

The right rotation operation is an operation of rotating the operating lever 9 in the neutral state to the right around the axis of the operating lever 9. The left rotation operation is an operation of rotating the operating lever 9 in the neutral state to the left around the axis of the operating lever 9.

Note that the operating lever 9 can be tilted in all direction of 360 degrees and therefore can also be tilted to a midpoint between the front side and the right side, to a midpoint between the right side and the rear side, to a midpoint between the rear side and the left side, and to a midpoint between the left side and the front side. In this case, one of the front tilt operation, the rear tilt operation, the right tilt operation, and the left tilt operation is decided depending on a later-described zone where the operating lever 9 is located, in an operation region of the operating lever 9.

Next, the zone of the operating lever 9 will be described referring to FIG. 4 and FIG. 5. Here, the zone is a region set by dividing a region where the operating lever 9 is operable (hereinafter, referred to as an operation region) into a plurality of portions. In this embodiment, the operation region is divided into six zones. Each of the six divided zones corresponds to one of the above-described six operations.

Figure 4:
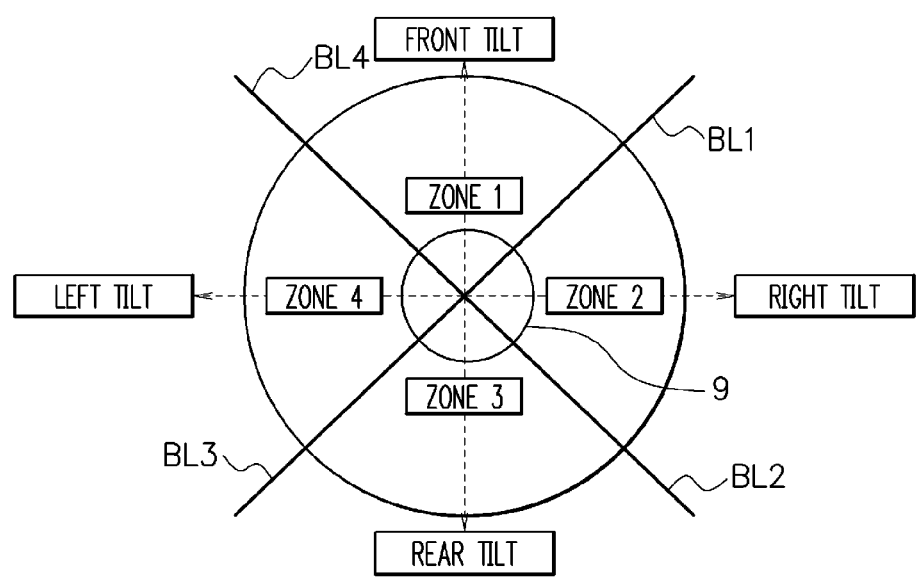
FIG. 4 is a view illustrating a zone 1 to a zone 4 of an operation region of the operating lever.

FIG. 4 is a view of the operating lever 9 as viewed from above and illustrates a zone 1 to a zone 4.

In FIG. 4, as boundary lines for dividing the zones, a boundary line BL1 to a boundary line BL4 are illustrated which are tilted to the left and right at 45 degrees with respect to a front-rear center line passing through the axis of the operating lever 9 in the neutral state. The zone 1 to the zone 4 are equally divided quarters as described above so that the boat operator easily recognizes the zones, thus making it possible to prevent wrong operation. Note that the boundary lines BL1 to BL4 are indications when the boat operator operates the operating lever 9, and it is therefore preferable that they are actually provided at the joystick 10.

The zone 1 is a region between the boundary line BL1 and the boundary line BL4. The operation of the operating lever 9 tilted into the zone 1 is associated with the front tilt operation.

The zone 2 is a region between the boundary line BL1 and the boundary line BL2. The operation of the operating lever 9 tilted into the zone 2 is associated with the right tilt operation.

The zone 3 is a region between the boundary line BL2 and the boundary line BL3. The operation of the operating lever 9 tilted into the zone 3 is associated with the rear tilt operation.

The zone 4 is a region between the boundary line BL3 and the boundary line BL4. The operation of the operating lever 9 tilted into the zone 4 is associated with the left tilt operation.

Figure 5:
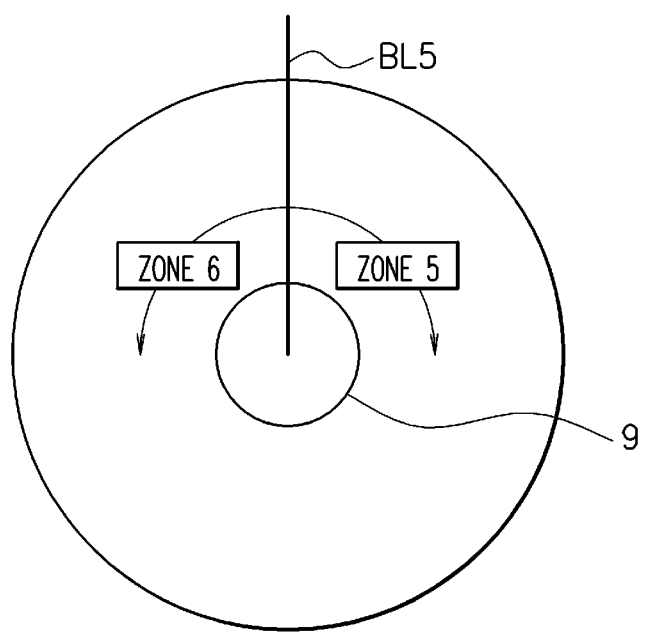
FIG. 5 is a view illustrating a zone 5 and a zone 6 of the operation region of the operating lever.

FIG. 5 is a view of the operating lever 9 as viewed from above and illustrates a zone 5 to a zone 6.

In FIG. 5, as a boundary line for dividing the zones, a boundary line BL5 is illustrated which passes through the axis of the operating lever 9 and extends to the front side.

The zone 5 is a rotation region on the right side of the boundary line BL5. The operation of the operating lever 9 rotated to the zone 5 around the axis is associated with the right rotation operation.

The zone 6 is a rotation region on the left side of the boundary line BL5. The operation of the operating lever 9 rotated to the zone 6 around the axis is associated with the left rotation operation.

The joystick 10 detects the zone where the operating lever 9 is located and outputs information on the detected zone to the helm controller 20.

Next, the behavior of the boat 1 when the operating lever 9 is operated will be described.

FIG. 6 is a chart illustrating a table in which the zone where the operating lever 9 is located and the behavior of the boat and so on are associated with each other. This table is stored beforehand in the ROM 22 or the like. In the table illustrated in FIG. 6, information on the behavior of the boat, information on the shift position of the left outboard motor 3L, information on the shift position of the right outboard motor 3R, and information on the steering specification are associated with information on each zone.

The helm controller 20 can acquire the information on the shift position of the left outboard motor 3L, the information on the shift position of the right outboard motor 3R, and the information on the steering specification which are associated with a zone by referring to the table illustrated in FIG. 6 on the basis of the information on the zone detected by the joystick 10. The helm controller 20 controls the steering actuators 27, the electric control type throttles 30, and the shift actuators 31 of the outboard motors 3L, 3R so as to realize the shift position of the left outboard motor 3L, the shift position of the right outboard motor 3R, and the steering specification. Thus, the behavior of the boat in the table illustrated in FIG. 6 can be realized.

Hereinafter, the behavior of the boat according to the zone where the operating lever 9 is located will be concretely described.

FIG. 7A is a schematic view illustrating the behavior of the boat 1 when the operating lever 9 is located in the zone 1 or the zone 3. FIG. 7A indicates that when the operating lever 9 is tilted straight to the front side/rear side in the zone 1/zone 3, the boat 1 moves straight forward/straight rearward. Further, FIG. 7A indicates that when the operating lever 9 is tilted to the front side with one of right and left components in the zone 1 (when tilted in proximity to the boundary line BL1 or the boundary line BL4), the boat 1 moves forward while turning to the right or turning to the left according to the magnitude of the one of the right and left components. Similarly, FIG. 7A indicates that when the operating lever 9 is tilted to the rear side with one of right and left components in the zone 3 (when tilted in proximity to the boundary line BL2 or the boundary line BL3), the boat 1 moves rearward while turning to the right or turning to the left according to the magnitude of the one of the right and left components.

Here, processing of the helm controller 20 when the zone 1 is detected will be described. The helm controller 20 refers to the table illustrated in FIG. 6 on the basis of the information on the zone 1 detected by the joystick 10 to acquire information that the shift position of the left outboard motor 3L is a forward movement (F), information that the shift position of the right outboard motor 3R is a forward movement (F), and information of almost parallel as the steering specification. Here, almost parallel in the steering specification means that the steering angles of the outboard motor 3L and the outboard motor 3R are set to almost the same angle.

FIG. 7B and FIG. 7C illustrate states that the helm controller 20 controls the left outboard motor 3L and the right outboard motor 3R to realize the acquired shift positions and steering specification. Here, arrows F extending from the outboard motors 3L, 3R indicate that the shift positions of the outboard motors 3L, 3R are forward movements. Further, the directions of the arrows F are directions of thrusts (forces acting on the boat 1) of the outboard motors 3L, 3R. Besides, straight lines extending in parallel with the arrows F are the directions of the outboard motors 3L, 3R and can be recognized as the steering angles. Further, the lengths of the arrows F indicate the magnitudes of the thrusts of the outboard motors 3L, 3R. Besides, an arrow extending from the moving center G indicates a travel direction of the boat 1.

In FIG. 7B and FIG. 7C, the shift positions of the outboard motors 3L, 3R are forward movements (F) and the steering specification is almost parallel because the steering angles of the outboard motor 3L and the outboard motor 3R are almost the same angle, like the shift positions and the steering specification associated with the zone 1 illustrated in FIG. 6. Note that the helm controller 20 controls the thrusts of the outboard motors 3L, 3R to the same predetermined magnitude in the zone 1.

Here, the behavior of the boat 1 illustrated in FIG. 7B indicates a forward movement extending straight from the moving center G. The behavior illustrated in FIG. 7B corresponds to an operation (an arrow 71 illustrated in FIG. 7A) of the operating lever 9 illustrated in FIG. 7A tilted straight to the front side in the zone 1.

On the other hand, the behavior of the boat 1 illustrated in FIG. 7C indicates a forward movement with a left turn. The behavior illustrated in FIG. 7C corresponds to an operation (an arrow 72 illustrated in FIG. 7A) of the operating lever 9 illustrated in FIG. 7A tilted in proximity to the boundary line BL4 in the zone 1.

Thus, the joystick 10 also detects the operation position (tilted position) in the zone 1 in addition to the information on the zone 1. The helm controller 20 changes the steering angles of the outboard motor 3L and the outboard motor 3R according to the operation position in the zone 1 detected by the joystick 10. However, even when changing the steering angles, the helm controller 20 changes the steering angles while keeping the steering angles of the outboard motor 3L and the outboard motor 3R at almost the same angle because the operating lever 9 is located in the zone 1.

It is assumed that the joystick 10 has detected an operation of moving the operating lever 9 to the left and right in the zone 1 with the operating lever 9 tilted in the zone 1. In this case, the helm controller 20 sequentially changes the steering angles of the outboard motor 3L and the outboard motor 3R according to the change in the operation position in the zone 1 detected by the joystick 10. Accordingly, the boat 1 is steered to perform a left turn, a forward movement, and a right turn in sequence, according to the left and right movements of the operating lever 9 in the zone 1. However, even when sequentially changing the steering angles, the helm controller 20 changes the steering angles while keeping the steering angles of the outboard motor 3L and the outboard motor 3R at almost the same angle because the operating lever 9 is located in the zone 1.

Note that though the case when the zone 1 has been detected is described here, the helm controller 20 can perform processing similarly even when the zone 3 has been detected. In short, the helm controller 20 controls the left outboard motor 3L and the right outboard motor 3R so as to realize the shift positions and the steering specification associated with the zone 3.

FIG. 8A is a schematic view illustrating the behavior of the boat 1 when the operating lever 9 is located in the zone 2 or the zone 4. FIG. 8A indicates that when the operating lever 9 is tilted straight to the right or left in the zone 2/zone 4, the boat 1 moves parallel toward the right or left. Further, FIG. 8A indicates that when the operating lever 9 is tilted to the right side with one of front and rear components in the zone 2 (when tilted in proximity to the boundary line BL1 or the boundary line BL2), the boat 1 moves parallel diagonally right with the one of front and rear components. Similarly, FIG. 8A indicates that when the operating lever 9 is tilted to the left side with one of front and rear components in the zone 4 (when tilted in proximity to the boundary line BL4 or the boundary line BL3), the boat 1 moves parallel diagonally left with the one of front and rear components. In short, the zone 2 and the zone 4 indicate parallel movements (except the forward movement and the rearward movement) without a turn of the boat 1.

Here, the processing of the helm controller 20 when the zone 2 has been detected will be described. The helm controller 20 refers to the table illustrated in FIG. 6 on the basis of the information on the zone 2 detected by the joystick 10 to acquire information that the shift position of the left outboard motor 3L is a forward movement (F), information that the shift position of the right outboard motor 3R is a rearward movement (R), and information of a letter of "V" (truncated chevron shape) as the steering specification. Here, the letter of "V" in the steering specification means that steering is performed so that the center line of the outboard motor 3L and the center line of the outboard motor 3R, when extended, point to the moving center G. In other words, the steering angles of the outboard motor 3L and the outboard motor 3R are symmetric about the center line C of the boat 1.

FIG. 8B and FIG. 8C illustrate states that the helm controller 20 controls the left outboard motor 3L and the right outboard motor 3R to realize the acquired shift positions and steering specification. Here, an arrow R extending from the outboard motor 3R indicates that the shift position of the outboard motor 3R is a rearward movement. Further, the direction of the arrow R is a direction of a thrust (force acting on the boat 1) of the outboard motor 3R. Besides, a straight line extending in parallel with the arrow R is the direction of the outboard motor 3R and can be recognized as the steering angle. Further, the length of the arrow R indicates the magnitude of the thrust of the outboard motor 3R.

In FIG. 8B and FIG. 8C, the shift position of the outboard motor 3L is a forward movement (F), the shift position of the outboard motor 3R is a rearward movement (R), and the steering specification is the letter of "V" in which the steering angles of the outboard motor 3L and the outboard motor 3R are symmetric about the center line C, like the shift positions and the steering specification associated with the zone 2 illustrated in FIG. 6. Note that in FIG. 8B, the helm controller 20 controls the thrusts of the outboard motors 3L, 3R to the same magnitude. On the other hand, in FIG. 8C, the helm controller 20 controls the thrusts so that the thrust of the outboard motor 3L is larger than the thrust of the outboard motor 3R.

Here, the behavior of the boat 1 illustrated in FIG. 8B indicates a right-lateral parallel movement extending straight laterally from the moving center G. The behavior illustrated in FIG. 8B corresponds to an operation (an arrow 81 illustrated in FIG. 8A) of the operating lever 9 illustrated in FIG. 8A tilted straight to the right side in the zone 2.

On the other hand, the behavior of the boat 1 illustrated in FIG. 8C indicates a diagonally forward right parallel movement. The behavior illustrated in FIG. 8C corresponds to an operation (an arrow 82 illustrated in FIG. 8A) of the operating lever 9 illustrated in FIG. 8A tilted in proximity to the boundary line BL1 in the zone 2.

Thus, the joystick 10 detects the operation position (tilted position) in the zone 2 in addition to the information on the zone 2. The helm controller 20 changes the thrusts of the outboard motor 3L and the outboard motor 3R according to the operation position in the zone 2 detected by the joystick 10. For example, in the operation of tilting in proximity to the boundary line BL1, the helm controller 20 controls the thrusts so that the thrust of the outboard motor 3L is larger than the thrust of the outboard motor 3R. However, even when changing the thrusts, the helm controller 20 changes the thrusts while keeping the outboard motor 3L and the outboard motor 3R in the letter of "V" because the operating lever 9 is located in the zone 2.

It is assumed that the joystick 10 has detected an operation of moving the operating lever 9 to the front and rear in the zone 2 with the operating lever 9 tilted in the zone 2. In this case, the helm controller 20 sequentially changes the thrusts of the outboard motor 3L and the outboard motor 3R according to the change in the operation position in the zone 2 detected by the joystick 10. Accordingly, the boat 1 is steered to perform a diagonally forward right parallel movement, a right-lateral parallel movement, and a diagonally rearward right parallel movement in sequence, according to the front and rear movements of the operating lever 9 in the zone 2. However, even when sequentially changing the thrusts, the helm controller 20 changes the thrusts while keeping the outboard motor 3L and the outboard motor 3R in the letter of "V" because the operating lever 9 is located in the zone 2.

Note that though the case where the zone 2 has been detected is described here, the helm controller 20 can perform processing similarly even when the zone 4 has been detected. In short, the helm controller 20 controls the left outboard motor 3L and the right outboard motor 3R so as to realize the shift positions and the steering specification associated with the zone 4.

FIG. 9A is a schematic view illustrating the behavior of the boat 1 when the operating lever 9 is located in the zone 5 or the zone 6. FIG. 9A indicates that when the operating lever 9 is rotated around the axis to the zone 5/zone 6, the boat 1 turns at a fixed point to the right or left.

Here, the processing of the helm controller 20 when an operation to the zone 5 has been detected will be described. The helm controller 20 refers to the table illustrated in FIG. 6 on the basis of the information on the zone 5 detected by the joystick 10 to acquire information that the shift position of the left outboard motor 3L is a forward movement (F), information that the shift position of the right outboard motor 3R is a rearward movement (R), and information of parallel as the steering specification. Here, parallel in the steering specification means that the steering angles of the outboard motor 3L and the outboard motor 3R are the same angle (0 degree here).

FIG. 9B illustrates a state that the helm controller 20 controls the left outboard motor 3L and the right outboard motor 3R to realize the acquired shift positions and steering specification.

In FIG. 9B, the shift position of the outboard motor 3L is a forward movement (F), the shift position of the outboard motor 3R is a rearward movement (R), and the steering specification is parallel because the steering angles of the outboard motor 3L and the outboard motor 3R are 0 degree, like the shift positions and the steering specification associated with the zone 5 illustrated in FIG. 6.

Here, the behavior of the boat 1 illustrated in FIG. 9B indicates a right turn at a fixed point using the moving center G as the fixed point. The behavior illustrated in FIG. 9B corresponds to an operation (an arrow 91 illustrated in FIG. 9A) of the operating lever 9 illustrated in FIG. 9A rotated to the zone 5 around the axis.

Note that the joystick 10 may detect an operation position in the zone 5 (a rotation angle from the boundary line BL5) in addition to the information on the zone 5. The helm controller 20 increases more the thrusts of the outboard motor 3L and the outboard motor 3R while keeping them equal as the rotation angle in the zone 5 detected by the joystick 10 is larger. However, even when changing the thrusts, the helm controller 20 changes the thrusts while keeping the steering angles of the outboard motor 3L and the outboard motor 3R at almost the same angle because the operating lever 9 is located in the zone 5.

Note that though the case when the zone 5 has been detected is described here, the helm controller 20 can perform processing similarly even when the zone 6 has been detected. In short, the helm controller 20 controls the left outboard motor 3L and the right outboard motor 3R so as to realize the shift positions and the steering specification associated with the zone 6.

Dividing the operation region of the operating lever 9 into six zones as described above allows the boat operator to intuitively perform operations of the forward movement, the rearward movement, the right parallel movement, the left parallel movement, the right turn at a fixed point, and the left turn at a fixed point, thus making it possible to improve the operability of the boat 1.

However, when an operation of moving the operating lever 9 from zone to zone is performed, a plurality of steering methods can be considered. Here, the operation of moving from zone to zone means, for example, that the operating lever 9 in a state of being tilted first in the zone 1 is moved to the left or right in a manner to draw a circle so as to cross the boundary line BL4 or the boundary line BL1 and move into the zone 4 or the zone 2. Further, the operation also means, for example, that the operating lever 9 in a state of being rotated first to the right around the axis to move into the zone 5 is moved to the zone 1 to the zone 4. Further, the operation also means, for example, that the operating lever 9 in a state of being tilted to the zone 1 is rotated to the right around the axis of the operating lever 9 to move into the zone 5.

In this embodiment, even when the operation of moving the operating lever 9 from zone to zone is performed, the steering that reflects the intention first indicated by the boat operator is performed. More specifically, even when the operating lever 9 is moved zone to zone, the zone that is detected first when the operating lever 9 is operated from the neutral state is kept. Keeping the zone into which the operating lever 9 is operated first and controlling the outboard motors 3L, 3R makes it possible to continue the steering of the boat reflecting the intention that is indicated first by the boat operator.

On the other hand, when steering of the boat 1 according to a different zone is desired, the operating lever 9 is once returned to the neutral state and then moved to the different zone, thereby enabling the steering of the boat according to the different zone. The operation enabling the steering of the boat 1 according to the different zone by returning the operating lever 9 to the neutral state as described above is an operation that can be intuitively recognized by the boat operator.

Hereinafter, the processing by the steering system 100 in this embodiment will be concretely described referring to a flowchart illustrated in FIG. 10. The flowchart illustrated in FIG. 10 is realized by the CPU 21 of the helm controller 20 executing the program stored in the ROM 22. Note that the flowchart illustrated in FIG. 10 is started, for example, by the boat operator changing the changeover switch 11 so that the operation of the joystick 10 is enabled.

First, at Step S11, the boat operator performs one of the operations of the front tilt operation, the rear tilt operation, the right tilt operation, the left tilt operation, the right rotation operation, and the left rotation operation, from the neutral state using the operating lever 9.

At Step S12, the joystick 10 detects a zone (the zone 1 to the zone 6) where the operating lever 9 operated at Step S11 is located, via the lever sensor. In this event, the joystick 10 also detects the operation position in the zone. The joystick 10 outputs information on the detected zone and information on the operation position in the zone to the helm controller 20. The CPU 21 of the helm controller 20 acquires the information on the zone and the information on the operation position in the zone. This processing corresponds to an example of processing by a zone acquisition means (zone acquisition unit).

At Step S13, the CPU 21 of the helm controller 20 temporarily stores the information on the zone acquired from the joystick 10, into the RAM 23. This processing corresponds to an example of processing by a storage processing means (storage processing unit).

At Step S14, the CPU 21 of the helm controller 20 controls the outboard motors 3L, 3R as described with the above-explained FIG. 6 to FIG. 9 on the basis of the information on the zone stored in the RAM 23 and the information on the operation position in the zone acquire from the joystick 10. This processing corresponds to an example of processing by a steering control means (steering control unit). Accordingly, the behavior of the boat 1 according to the operation of the operating lever 9 can be realized.

At Step S15, the CPU 21 of the helm controller 20 determines whether the joystick 10 has detected the neutral state of the operating lever 9. This processing corresponds to an example of processing by a determination means (determination unit). The CPU 21 returns to Step S14 in the case where the neutral state has not been detected, whereas proceeds to Step S16 in the case where the neutral state has been detected.

At Step S16, the CPU 21 of the helm controller 20 erases the information on the zone stored in the RAM 23. This processing corresponds to an example of processing by an erasure means (erasure unit). Further, the CPU 21 of the helm controller 20 returns the shift positions of the outboard motors 3L, 3R and the steering specification to the initial state and ends the steering of the boat 1. Note that the helm controller 20 is not limited to returning them to the initial state but may only shift the engines of the outboard motors 3L, 3R to an idling state.

When the operation of the operating lever 9 moving from zone to zone is performed by the above-described processing, the CPU 21 of the helm controller 20 controls the outboard motors 3L, 3R on the basis of the information on the zone stored in the RAM 23 so as to return to the processing at Step S14 until the operating lever 9 is returned to the neutral state.

For example, it is assumed that the operating lever 9 is moved to either to the left or right from the state where it is located in the zone 1 and moved to the zone 2 or the zone 4 crossing the boundary line BL1 or the boundary line BL4. In the case, since the information on the zone 1 is kept stored in the RAM 23, the CPU 21 of the helm controller 20 controls the outboard motors 3L, 3R with the shift position of the left outboard motor 3L and the shift position of the right outboard motor 3R and the steering specification which are associated with the zone 1. Accordingly, even if the operating lever 9 is moved to the zone 2 or the zone 4 without being returned from the zone 1 to the neutral state, the behavior of the boat 1 is the forward movement with a right turn or a left turn but not the right parallel movement or the left parallel movement.

In other words, even if the boat operator accidentally moves the operating lever 9 to a different zone from the zone to which the boat operator has first moved the operating lever 9, the behavior of the boat 1 in the zone to which the boat operator has first moved the operating lever 9 is continued. As described above, prioritizing the intention indicated first by the boat operator prevents the behavior of the boat 1 from becoming different from the first intention of the boat operator even when the operating lever 9 is moved to the different zone.

Further, even if the operating lever 9 is accidentally moved to a different zone, the shift positions of the outboard motors 3L, 3R and the steering specification of the zone to which the operating lever 9 is moved first are kept, so that the efficiency of the steering is never deteriorated. Inversely, if the behavior of the boat 1 is changed every time the operating lever 9 is moved to a different zone, the shift positions of the outboard motors 3L, 3R and the steering specification change when the operating lever 9 is accidentally moved to a different zone, resulting in deteriorated efficiency.

Note that when the operating lever 9 is moved to a different zone without being returned to the neutral state, the CPU 21 of the helm controller 20 stores also information on the operation position of the operating lever 9 immediately before entering the different zone together with information on the zone before the operating lever 9 is moved to the different zone, into the RAM 23. For example, when the operating lever 9 is moved to the zone 2 without being returned from the zone 1 to the neutral state, the information on the zone 1 and the information on the operation position at the boundary line BL1 in the zone 1 are stored in the RAM 23.

Even when the operating lever 9 is moved to the zone 2, the CPU 21 of the helm controller 20 controls the outboard motors 3L, 3R to realize the behavior of the boat associated with the zone 1 and controls the steering angles of the outboard motors 3L, 3R according to the operation position in the zone 1 stored in the RAM 23. Accordingly, even when the operating lever 9 is moved to the zone 2, the right parallel movement is not performed but the right turn is continuously performed in the boat 1.

Note that when the operating lever 9 is returned to the neutral state, the CPU 21 of the helm controller 20 erases the information on the zone stored in the RAM 23 and erases also the information on the operation position of the operating lever 9 immediately before the operating lever 9 enters a different zone.

The present invention has been described using the above-described embodiment, but the present invention is not limited to the above-described embodiment and can be changed within the scope of the present invention. For example, the boat 1 in which the two outboard motors 3L, 3R are attached thereto has been described in the above-described embodiment, but is not limited to this case and may be a boat 1 in which at least two outboard motors 3L, 3R are attached thereto.

Besides, the above-described processing in the case of being realized by the CPU 21 executing the program has been described in the above-described embodiment but is not limited to this case, and the above-described processing may executed by circuits constituted by hardware. Further, the present invention includes the above-described program and a computer-readable recording medium recording the program.

INDUSTRIAL APPLICABILITY

The present invention can be used in the case of steering a boat using an operating lever that is tiltable in all directions from a neutral state.

The invention claimed is:

1. A control device for outboard motors that controls two outboard motors attached to a boat, according to an operation by an operating lever that is tiltable in all directions from a neutral state, the control device for outboard motors comprising:
    a zone acquisition unit that acquires a zone where the operating lever is located by an operation from a neutral state, among a plurality of zones made by dividing an operation region of the operating lever;
    a steering control unit that controls shift positions of the two outboard motors and a steering specification according to the zone acquired by the zone acquisition unit; and
    a determination unit that determines whether the operating lever is in the neutral state,
    wherein when the operating lever is moved to a different zone without being returned to the neutral state, the steering control unit controls the shift positions of the two outboard motors and the steering specification according to the zone acquired by the zone acquisition unit until the determination unit determines that the operating lever is in the neutral state.

2. The control device for outboard motors according to claim 1, further comprising:
    a storage processing unit that stores information on the zone acquired by the zone acquisition unit; and
    an erasure unit that erases the information on the zone stored by the storage processing unit,
    wherein the steering control unit controls the shift positions of the two outboard motors and the steering specification according to the zone stored by the storage processing unit, and
    wherein when the determination unit determines that the operating lever is in the neutral state, the erasure unit erases the information on the zone stored by the storage processing unit.

3. The control device for outboard motors according to claim 1,
    wherein the steering specification is a steering specification of the boat decided according to steering angles of the two outboard motors.

4. The control device for outboard motors according to claim 1, further comprising:
    an operation position acquisition unit that acquires an operation position in a zone immediately before the operating lever is moved to a different zone,
    wherein when the operating lever is moved to the different zone without being returned to the neutral state, the steering control unit controls the two outboard motors according to the zone acquired by the zone acquisition unit and the operation position in the zone immediately before the operating lever is moved to the different zone acquired by the operation position acquisition unit.

5. A control method for outboard motors that controls two outboard motors attached to a boat, according to an operation by an operating lever that is tiltable in all directions from a neutral state, the control method for outboard motors comprising:
    a zone acquisition step of acquiring a zone where the operating lever is located by an operation from a neutral state, among a plurality of zones made by dividing an operation region of the operating lever;
    a steering control step of controlling shift positions of the two outboard motors and a steering specification according to the zone acquired by the zone acquisition step; and
    a determination step of determining whether the operating lever is in the neutral state,
    wherein when the operating lever is moved to a different zone without being returned to the neutral state, the steering control step controls the shift positions of the two outboard motors and the steering specification according to the zone acquired by the zone acquisition step until the determination step determines that the operating lever is in the neutral state.

6. A computer readable non-transitory recording medium with a program for controlling two outboard motors attached to a boat, according to an operation by an operating lever that is tiltable in all directions from a neutral state, the program causing a computer to execute:
    a zone acquisition step of acquiring a zone where the operating lever is located by an operation from a neutral state, among a plurality of zones made by dividing an operation region of the operating lever;
    a steering control step of controlling shift positions of the two outboard motors and a steering specification according to the zone acquired by the zone acquisition step; and
    a determination step of determining whether the operating lever is in the neutral state,
    wherein when the operating lever is moved to a different zone without being returned to the neutral state, the steering control step controls the shift positions of the two outboard motors and the steering specification according to the zone acquired by the zone acquisition step until the determination step determines that the operating lever is in the neutral state.

* * * * *